United States Patent [19]
Jeon et al.

[11] Patent Number: 5,559,809
[45] Date of Patent: Sep. 24, 1996

[54] TRANSMIT BLOCK UP-CONVERTER FOR VERY SMALL APERTURE TERMINAL REMOTE STATION

[75] Inventors: Soon I. Jeon; Jeong H. Kim, both of Deajeon, Rep. of Korea

[73] Assignee: Electronics and Telecommunications Research Institute, Daejeon, Rep. of Korea

[21] Appl. No.: 382,395

[22] Filed: Feb. 1, 1995

[30] Foreign Application Priority Data

Sep. 27, 1994 [KR] Rep. of Korea ............... 1994-24374

[51] Int. Cl.⁶ .................................................. H04J 1/02
[52] U.S. Cl. ................... 370/120; 370/121; 455/13.1; 455/116; 455/118
[58] Field of Search ........................ 370/113, 104.1, 370/112, 77, 79, 110.1, 85.1, 110.4, 53, 58.1, 68.1, 69.1, 76.1, 74, 98, 70, 120, 121; 455/12.1, 13.1, 13.2, 13.3, 13.4, 98, 112, 113, 127, 118

[56] References Cited

U.S. PATENT DOCUMENTS 4,748,622  5/1988  Muratani et al. ............... 370/104.1

Primary Examiner—Wellington Chin
Assistant Examiner—Huy D. Vu
Attorney, Agent, or Firm—Spencer & Frank

[57] ABSTRACT

A transmit block up-converter is provided for processing a multiplexed signal including a transmit IF signal, a reference frequency signal, a switching signal, a level signal and a constant-current signal, which is provided through one transmitting line from an indoor unit in the very small aperture terminal remote station for satellite communication. The transmit block up-converter includes a demultiplexer for demultiplexing the multiplexed signal; a frequency up-converter for frequency up-converting the transmit IF signal from the demultiplexer in response to the reference frequency signal, switching signal and level signal; an amplifier for amplifying the output signal from the demultiplexer; and an impedance matching circuit for impedance matching and amplifying an IF signal received from an external unit, and for outputting the impedance matched and amplified signal through one receiving line.

10 Claims, 3 Drawing Sheets

TRANSMIT BLOCK UP-CONVERTER FOR VERY SMALL APERTURE TERMINAL REMOTE STATION

BACKGROUND OF THE INVENTION

1. Field of the Invention

The present invention relates generally to a transmit block up-converter used in a very small aperture terminal remote station(VSAT VRS) for satellite communications and more particularly to a transmit block up-converter for processing a multiplexed signal of a variety of signals which is provided through one transmission line in the VSAT remote station for satellite communications.

2. Description of the Prior Art

Referring to FIG. 1 showing a schematic block diagram of a conventional VSAT remote station, a reference numeral 11 denotes a Modem, 12 denotes a transmit block up-converter(TBU), 13 denotes a low noise block down-converter, 14 denotes a antenna interface and 15 denotes an antenna. In the conventional VSAT remote station as shown in FIG. 1, a voltage signal for amplification, a transmit IF signal and a reference frequency signal from the Modem 11 are provided to the TBU 12 via a voltage signal line, a IF signal line and a reference frequency signal line respectively. The TBU 12 frequency-converts the transmit IF signal to tile RF(Radio Frequency) signal, and then amplifies and transmits it via the antenna interface 14 and the antenna 15 to a satellite. The signal received by the antenna 15 is provided to the Modem 11 via tile antenna interface 14 and the low noise block down-converter 13. Accordingly, the conventional VSAT remote station has a disadvantage that its constitution is complicated, because a number of signal lines should be used for transmitting and receiving the signals.

SUMMARY OF THE INVENTION

Therefore, it is one object of the invention to provide a transmit block up-converter capable of processing a multiplexed signal provided through only one transmitting line.

According to the present invention, it is provided a transmit block up-converting device for processing a multiplexed signal including a transmit IF signal, a reference frequency signal, a switching signal, a level signal and a constant-current signal, which is provided through one transmitting line from an indoor unit in the very small aperture terminal remote station for satellite communications, comprising: a means for demultiplexing said multiplexed signal; a means for frequency up-converting said transmit IF signal from said means for demultiplexing in response to said reference frequency signal, said switching signal and said level signal; a means for amplifying the output signal of said means for frequency up-converting in response to said constant-current signal from said means for demultiplexing; and a means for impedance matching and amplifying an IF signal received from an external unit, and for outputting the impedance matched and amplified signal through one receiving line.

BRIEF DESCRIPTION OF THE DRAWINGS

The present invention will be described in more detail with reference to the drawings in which.

DESCRIPTION OF THE PREFERRED EMBODIMENTS

Figure 1:
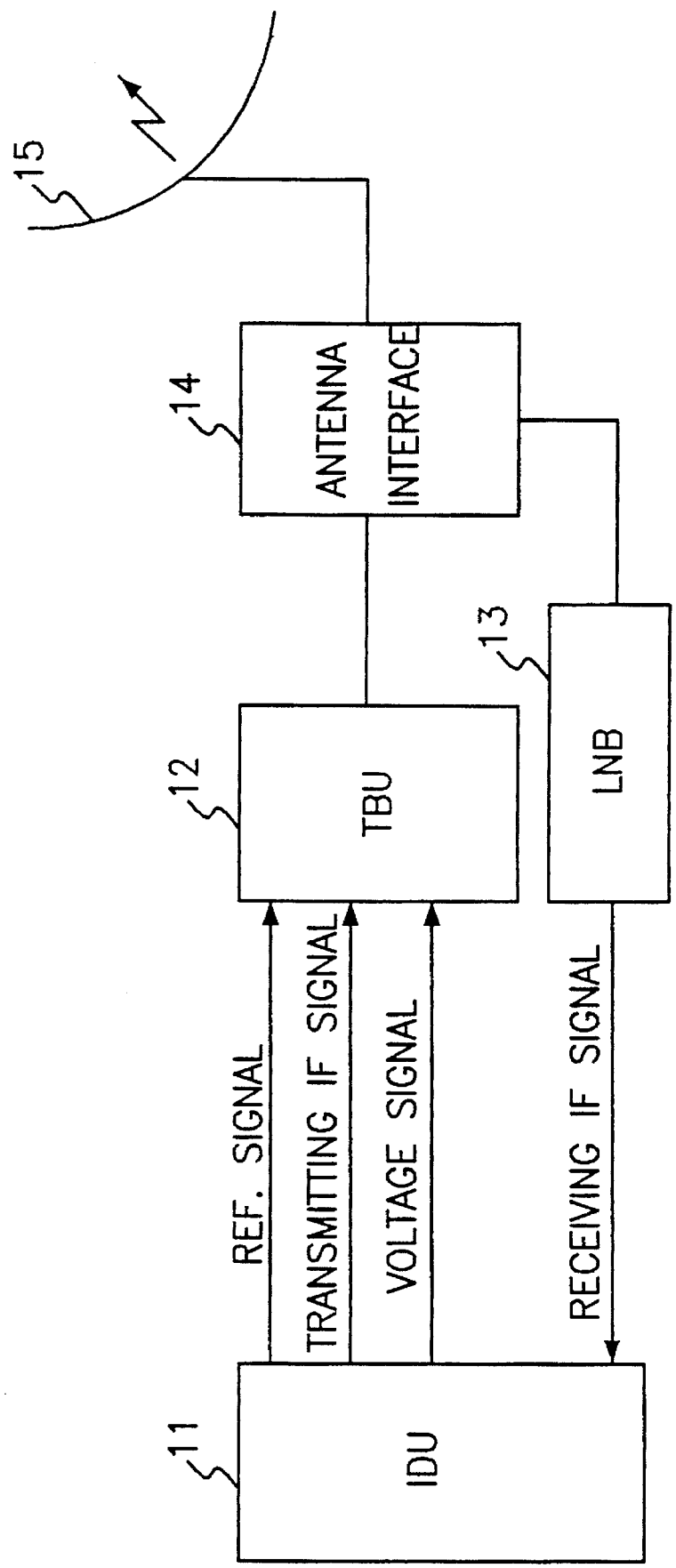
FIG. 1 is a schematic block diagram of a conventional VSAT remote station.
Figure 2:
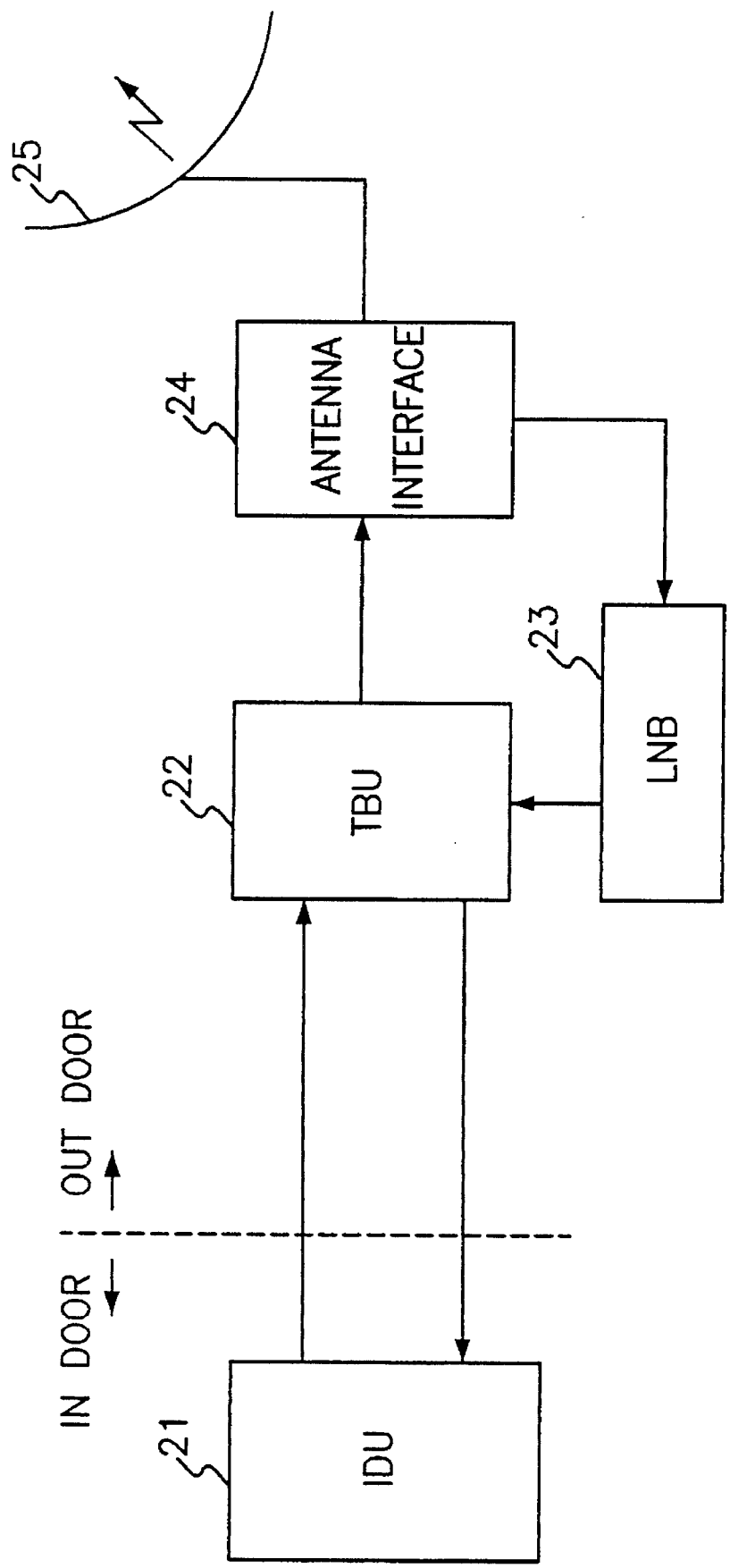
FIG. 2 is a schematic block diagram of a VSAT remote station implemented using a transmit block up-converter according to the invention.

In a VSAT remote station implemented using a transmit block up-converter according to the invention as shown in FIG. 2, a voltage signal for output amplification, a transmit intermediate frequency(IF) signal, a reference frequency signal, a switching signal and a level signal are multiplexed in a indoor unit(IDU) 21 and then a multiplexed signal is to be provided to a transmit block up-converter 22 via one transmitting line. The voltage signal for output amplification is converted to a constant-current signal for long distance transmission. An received RF signal from an antenna 25 is provided t a low noise block clown-converter 23 via an antenna interface 24. Then the RF signal is frequency-converted to the IF signal and amplified in the low noise block down-converter 23, and then the IF signal is provided to the IDU 21 via the transmit block up-converter 22 anti a receiving line.

Figure 3:
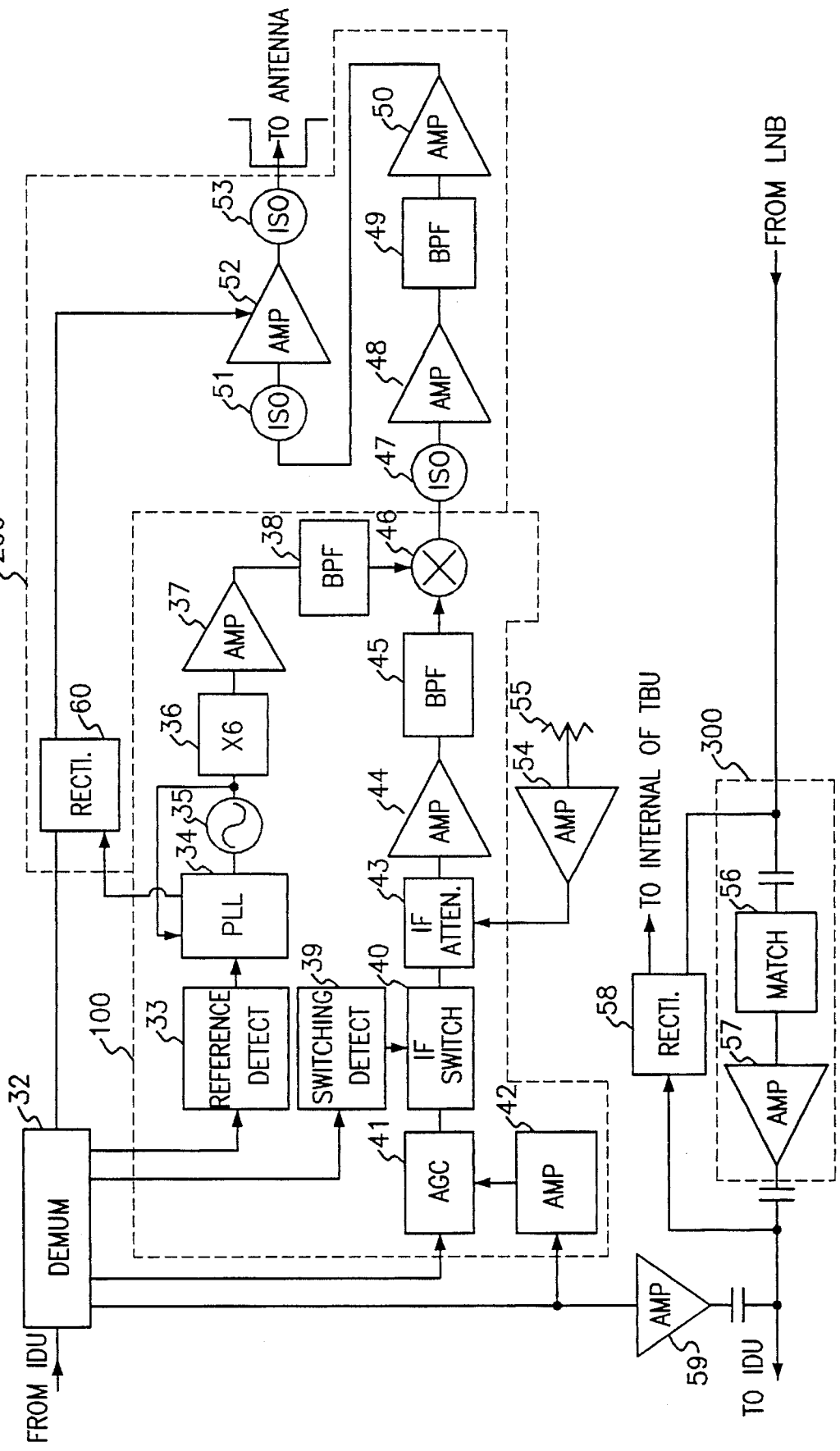
FIG. 3 is a detailed block diagram of a transmit block up-converter according to the invention.

Now referring to FIG. 3 showing a detailed block diagram of a transmit block up-converter(TBU) according to the invention, the TBU is largely divided into a demultiplexer 32, a frequency up-converting portion 100, a high output amplification portion 200 and an impedance matching and amplification portion 300. The multiplexed signal from the IDU 21 is divided into a transmit IF signal, a reference frequency signal, a switching signal, a level signal and a constant-current signal in the demultiplexer(DEM) 32. The divided constant-current signal is converted into a constant-voltage signal in a current rectifier 60, and then the constant-voltage signal is provided to a high output amplifier 52. The reference frequency signal is provided to a reference frequency signal level adjusting circuit 33 which adjusts the level of the signal. Then the reference frequency signal is used for synchronization of a phase locked loop(PLL) 34. The output of the PLL 34 is applied to a voltage controlled oscillator(VCO) 35. The VCO 35 generates a frequency signal under control of the PLL 34. The frequency signal from the VCO 35 is fed-back to the PLL 34 and also is provided to a frequency multiplier(X6) 36. The multiplier 36 multiplies the frequency signal by 6 times. The multiplied frequency signal is provided to the mixer 46 via an amplifier 37 for gain compensation and a band pass filter 38 for suppressing a harmonic wave. The level signal is provided to a level detector d2 which detects the level required by the IDU 21. The output of the level detector 42 is used to control a automatic gain control circuit (AGC) 41. The switching signal is applied to a switching signal detector 39 which controls a IF switch 40 depending on a detected request signal such as a signal transmission request or a switch off request. A temperature sensor 55 detects an internal temperature of the outdoor TBU. The output signal of the sensor 55 is amplified in a amplifier 54 and then is used to control the gain of an IF attenuator 43. By controlling the gain of an IF attenuator 43, the variation in the amplification factor of the amplification elements in the TBU can be compensated depending on the internal temperature variation. The transmit IF signal is provided via the IF AGC 41, the IF switch 40, the IF attenuator 43, the amplifier 44 and the low pass filter 45 to the mixer 46. Then, the IF signal is mixed with the frequency signal provided from the VCO 35 via the multiplier 36, amplifier 37 and the band pass filter 38, and thus is converted into the transmit RF signal. This RF signal is then applied to an isolator 47 which passes a forward signal and blocks a backward signal. The RF signal from the isolator 47 is provided to the high-output amplifier 52 through an amplifier 48, a band pass filter 49, an amplifier 50 and an isolator 51. The high-output amplifier 52 amplifies the RF signal by mean of the constant-voltage signal for high output amplification. The amplified RF signal is transmitted via the antenna interface 24 and the antenna 25 to a satellite. The received IF signal from the LNB 23 is provided to an impedance matching circuit 56 in the impedance matching and amplification portion 300. Then the received IF signal is amplified in an amplifier 57, and then is provided through the receiving signal line to IDU 21. Also, the level signal from the multiplexer 32 is fed-back through an amplifier 59 to the IDU 21. This level signal is used to determine the state of the transmission line. The power required to operate internal elements of the TBU is provided through the receiving line and a voltage rectifier 58 to the TBU.

It may be seen that the present invention provides the following advantages:

(1) the frequency up-conversion and high output amplification functions are performed by one unit.

(2) the construction is simple and cost is reduced, because a variety of signals are provided through only one transmission line.

(3) it is possible to determine the state of the transmission line by means of the transmit signal feed-back.

(4) the Dower is supplied stably, because the constant-current is used for high output amplification.

(5) the deterioration in the transmitting and receiving performance due to loss in the transmission line may be prevented by providing the AGC circuit and the receiving path.

While the invention has been described in its preferred embodiments, it is to be understood that the words which have been used are words of description rather than limitation and that changes and modifications may be made within the preview of the appended claims without departing from the true scope and spirit of the invention in its broader aspects.

Which is claimed is:

1. A transmit block up-converting device for processing a multiplexed signal including a transmit IF signal, a reference frequency signal, a switching signal, a level signal and a constant-current signal, which is provided through one transmitting line from an indoor unit in the very small aperture terminal remote station for satellite communications, comprising:

a means for demultiplexing said multiplexed signal;

a means for frequency up-converting said transmit IF signal from said means for demultiplexing in response to said reference frequency signal, said switching signal and said level signal;

a means for amplifying the output signal of said means for frequency up-converting in response to said constant-current signal from said means for demultiplexing; and a means for impedance matching and amplifying an IF signal received from an external unit, and for outputting the impedance matched and amplified signal through one receiving line.

2. A transmit block up-converting device as claimed in claim 1, further comprising:

a means for amplifying and feeding back said level signal said means for demultiplexing through the receiving line to the indoor unit.

3. A transmit block up-converting device as claimed in claim 2, further comprising:

a means for rectifying a constant-voltage signal provided through the receiving line from the indoor unit.

4. A transmit block up-converting device as claimed in claim 1, further comprising:

a means for sensing the internal temperature of the device, for amplifying a temperature signal, and for providing the amplified temperature signal to said means for frequency up-converting as a control signal.

5. A transmit block up-converting device as claimed in claim 1, wherein said means for frequency up-converting including:

a means for adjusting the level of said reference frequency signal from said means for demultiplexing;

a phase locked loop means connected to the output of said means for adjusting;

a voltage controlled oscillator means, responsive to the output signal of said phase locked loop means, for generating a frequency signal;

a means for multiplying said frequency signal from said voltage controlled oscillator means;

a first amplifier means connected to said means for multiplying; a first band pass filter means connected to said first amplifier means;

a means for detecting the switching signal from said means for demultiplexing;

a means for detecting the level signal from said means for demultiplexing;

a automatic gain control means for controlling the gain of said transmit IF signal from said means for demultiplexing in response to said level signal;

a switch means for controlling the output of said automatic gain control means in response to said switching signal;

a means for attenuating said transmit IF signal in response to said temperature signal from said means for sensing;

a second amplifier means connected to said means for attenuating;

a second band pass filter means connected to said second amplifier means; and a means for mixing said transmit IF signal from said second band pass filter means with said frequency signal from said first band pass filter means, thereby converting said transmit IF signal into the transmit RF signal.

6. A transmit block up-converting device as claimed in claim 1, wherein said means for amplifying the output signal including:

a means for rectifying said constant-current signal from said means for demultiplexing, thereby converting it into the constant-voltage signal in response to the output signal of said phase locked loop means;

an first isolator means for passing only transmit RF signal and which is connected to said means for mixing;

a first amplifier means connected to said first isolator means;

at first band pass filter means connected to said first amplifier means;

a second amplifier means connected to said first band pass filter means;

a second isolator means connected to said second amplifier means;

a third amplifier means for amplifying the transmit RF signal from said second isolator means in response to said constant-voltage signal from said means for rectifying; and a third isolator means connected to said third amplifier means.

7. A transmit block up-converting device as claimed in claim 2, further comprising:

a means for rectifying a constant-voltage signal provided through the receiving line from the indoor unit.

8. A transmit block up-converting device as claimed in claim 3, further comprising:

a means for sensing the internal temperature of the device, for amplifying a temperature signal, and for providing the amplified temperature signal to said means for frequency up-converting as a control signal.

9. A transmit block up-converting device as claimed in claim 4, wherein said means for frequency up-converting including:

a means for adjusting the level of said reference frequency signal from said means for demultiplexing;

a phase locked loop means connected to the output of said means for adjusting;

a voltage controlled oscillator means, responsive to the output signal of said phase locked loop means, for generating a frequency signal;

a means for multiplying said frequency signal from said voltage controlled oscillator means;

a first amplifier means connected to said means for multiplying;

a first band pass filter means connected to said first amplifier means;

a means for detecting the switching signal from said means for demultiplexing;

a means for detecting the level signal from said means for demultiplexing;

a automatic gain control means for controlling the gain of said transmit IF signal from said means for demultiplexing in response to said level signal;

a switch means for controlling the output of said automatic gain control means in response to said switching signal;

a means for attenuating said transmit IF signal in response to said temperature signal from said means for sensing;

a second amplifier means connected to said means for attenuating;

a second band pass filter means connected to said second amplifier means; and a means for mixing said transmit IF signal from said second band pass filter means with said frequency signal from said first band pass filter means, thereby converting said transmit IF signal into the transmit RF signal.

10. A transmit block up-converting device as claimed in claim 5, wherein said means for amplifying the output signal including:

a means for rectifying said constant-current signal from said means for demultiplexing, thereby converting it into the constant-voltage signal in response to the output signal of said phase locked loop means;

an first isolator means for passing only transmit RF signal and which is connected to said means for mixing;

a first amplifier means connected to said first isolator means;

a first band pass filter means connected to said first amplifier means;

a second amplifier means connected to said first band pass filter means;

a second isolator means connected to said second amplifier means;

a third amplifier means for amplifying the transmit RF signal from said second isolator means in response to said constant voltage signal from said means for rectifying; and a third isolator means connected to said third amplifier means.

* * * * *